(12) United States Patent
Conklin et al.

(10) Patent No.: US 10,977,189 B2
(45) Date of Patent: Apr. 13, 2021

(54) REDUCING FORWARD MAPPING TABLE SIZE USING HASHING

(71) Applicant: Seagate Technology LLC, Fremont, CA (US)

(72) Inventors: Kristofer Carlson Conklin, Burnsville, MN (US); Ryan James Goss, Prior Lake, MN (US); Reid Alan Welch, Carver, MN (US)

(73) Assignee: Seagate Technology LLC, Fremont, CA (US)

( * ) Notice: Subject to any disclaimer, the term of this patent is extended or adjusted under 35 U.S.C. 154(b) by 26 days.

(21) Appl. No.: 16/562,518

(22) Filed: Sep. 6, 2019

(65) Prior Publication Data

US 2021/0073141 A1 Mar. 11, 2021

(51) Int. Cl.
*G06F 12/1018* (2016.01)

(52) U.S. Cl.
CPC .. *G06F 12/1018* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 9,141,554 B1 * | 9/2015 | Candelaria | H03M 7/3091 |
| 9,268,682 B2 | 2/2016 | Tomlin et al. | |
| 9,652,389 B2 | 5/2017 | Vekiarides et al. | |
| 10,140,215 B1 | 11/2018 | Canepa et al. | |
| 2009/0193184 A1 | 7/2009 | Yu et al. | |
| 2015/0363327 A1 | 12/2015 | Chaitanya et al. | |
| 2016/0011788 A1 * | 1/2016 | Tsuchiya | G06F 11/00 711/154 |
| 2017/0185543 A1 * | 6/2017 | Nieuwejaar | G06F 3/0673 |
| 2018/0121364 A1 * | 5/2018 | Edgar | G06F 12/1009 |
| 2018/0210841 A1 * | 7/2018 | Yang | G06F 12/0292 |
| 2018/0307431 A1 * | 10/2018 | Gunnam | G11C 29/44 |
| 2019/0065392 A1 | 2/2019 | Erez et al. | |
| 2019/0095341 A1 | 3/2019 | Canepa et al. | |
| 2019/0155746 A1 * | 5/2019 | Bhatia | G06F 12/0246 |
| 2020/0034063 A1 * | 1/2020 | Somasundaram | G06F 3/0647 |
| 2020/0110710 A1 * | 4/2020 | Truelove | G06F 12/1063 |
| 2020/0341849 A1 * | 10/2020 | Shani | G06F 11/1471 |
| 2020/0341909 A1 * | 10/2020 | Vanninen | G06F 12/1018 |
| 2020/0364106 A1 * | 11/2020 | Chen | G06F 11/0793 |

* cited by examiner

*Primary Examiner* — Charles Rones
*Assistant Examiner* — Ralph A Verderamo, III
(74) *Attorney, Agent, or Firm* — Taylor English Duma LLP

(57) ABSTRACT

Technologies are described herein for or reducing the size of the forward mapping table in an SSD or other storage device using hashing. A physical address of a storage location within a storage media is determined for the storage of data associated with a logical block address. The data is written to the storage location and a hash value is computed from a representation of the physical address using a hash function, where the size of the hash value is smaller than the representation of the physical address and the hash value points to a plurality of separate storage locations in the storage media. The hash value is stored in the forward mapping table associated with logical block address as opposed to the representation of the physical address.

20 Claims, 6 Drawing Sheets

REDUCING FORWARD MAPPING TABLE SIZE USING HASHING

BRIEF SUMMARY

The present disclosure relates to technologies for reducing the size of the forward mapping table in an SSD or other storage device using hashing. According to some embodiments, a method for reducing the size of the forward mapping table comprises determining a physical address of a storage location within a storage media of the storage device to store data associated with a logical block address and writing the data to the storage location. A hash value is computed from a representation of the physical address of the storage location using a hash function, where the size of the hash value is smaller than the representation of the physical address and the hash value points to a plurality of separate storage locations in the storage media. The hash value is stored in the forward mapping table associated with logical block address as opposed to the representation of the physical address.

According to further embodiments, a storage device comprises a non-volatile memory comprising a plurality of storage locations, a forward mapping table for mapping logical block addresses to the plurality of storage locations, and a controller for storing user data from a host to the non-volatile memory. The controller is configured to determine a physical address of a storage location within the non-volatile memory to store data associated with a logical block address and write the data to the storage location. A hash value is computed from the physical address of the storage location using a hash function and the hash value is stored in the forward mapping table associated with the logical block address. In response to receiving a read command specifying the logical block address, the controller retrieves the hash value from the forward mapping table based on the logical block address and computes a plurality of physical addresses from the hash value using a reverse of the hash function. The controller than reads data from storage locations within the non-volatile memory corresponding to each of the plurality of physical addresses, and determines the data associated with the logical block address to return for the read command based on header information associated with the data read from the storage locations.

According to further embodiments, a computer-readable medium has processor-executable instructions stored thereon that, when executed by a CPU of a controller of a storage device, cause the CPU to determine a physical address of a storage location within a storage media of the storage device for the storage of data associated with a logical block address. The CPU computes a hash value from the physical address of the storage location using a hash function, where the size of the hash value is smaller than a size of a representation of the physical address, and stores the hash value in a forward mapping table of the controller. In response to receiving a read command specifying the logical block address, the CPU retrieves the hash value from the forward mapping table based on the logical block address and computes a plurality of physical addresses from the hash value using a reverse of the hash function. The CPU can then read data from storage locations within the storage media corresponding to each of the plurality of physical addresses and determine the data mapped to the logical block address to return for the read command based on header information associated with the data read from the storage locations.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
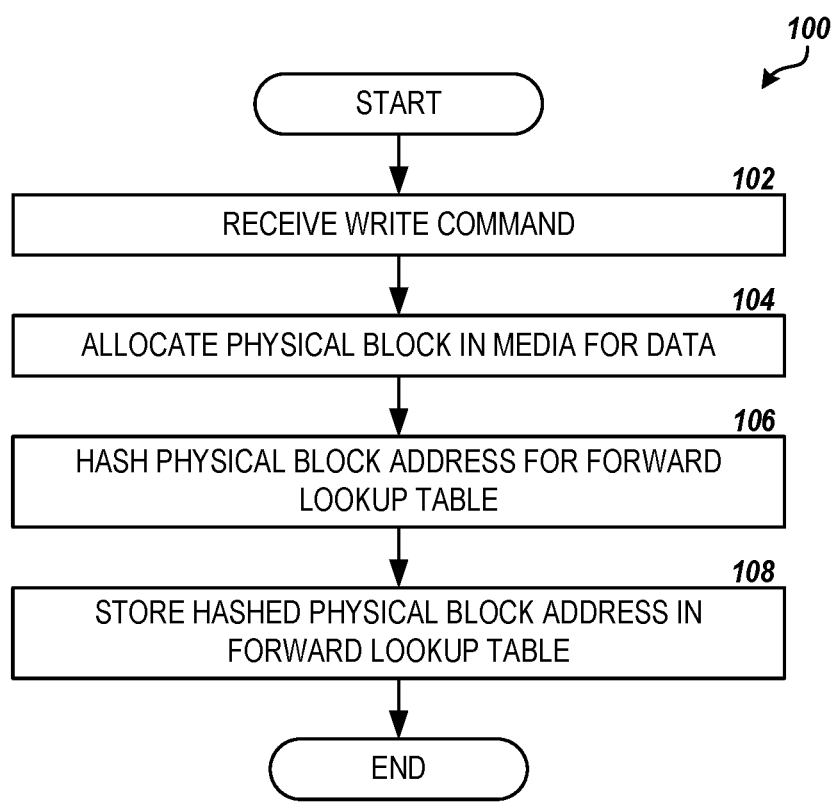
FIG. 1 is a flow diagram showing one routine for reducing the size of the forward mapping table in an SSD using hashing, according to embodiments described herein.

The following detailed description is directed to technologies for reducing the size of the forward mapping table in a solid-state drive ("SSD") or other storage device using hashing. In current performance-oriented SSDs, the forward mapping table, which converts a logical block address ("LBA") from a host into a physical location in the flash media, is considered an incompressible data format because it must map one-to-one all possible LBAs to all possible physical locations. Accordingly, as the size of the LBA space supported by a device and/or the physical storage capacity of the device grow, the size of the forward mapping table must scale proportionally. For example in a 32 TB SSD supporting 4 KB LBA block size, the size of the forward mapping table can be 32 GB. Since the entire forward mapping table may be stored in DRAM of the controller, the cost of the DRAM memory in the controller is increased considerably.

One option for reducing the size of the forward mapping table is to combine multiple LBAs into a secondary construct called a map unit ("MU"). Each MU comprises logical consecutive LBAs such that the collection is always mapped to the same location. For example if 8 LBAs are assigned to each MU, then the forward mapping table must only track the location of each MU, and its size is reduced by a factor of 8. However, this approach can lead to a significant increase in write amplification, since the entire MU must be rewritten for each LBA update, which has a detrimental impact on the performance and lifetime of the SSD. Another option is the use of tiered forward mapping, with the primary tier of the forward mapping table stored in the controller's DRAM while secondary and tertiary tiers are stored in the flash media. This approach can add latency to host read operations when the physical location of the target LBA is not currently available in the DRAM and must be fetched from the flash media, impacting performance of the drive.

Both of the above options attempt to control the vertical size of the forward mapping table through the reduction of the number of entries stored in the DRAM at any given time. However, as the physical capacity of SSDs and other storage devices grow, the size of the physical address stored in each entry of the forward mapping table also grows, increasing the horizontal size of the table and thus requiring more DRAM for storage. In addition, if the increased size of the entries exceeds the word boundary of the CPU of the controller, then either the size of the forward mapping table must be doubled to allow for the larger size of each entry, or the CPU must access the entries of the forward mapping table on non-word aligned boundaries, which is computationally expensive and can adversely affect read performance.

According to the embodiments described herein, a method for reducing the horizontal size of the forward mapping table, i.e., the size of each entry of the table, involves hashing the physical address to reduce its size. This results in each forward mapping table entry pointing to not a single physical location in the flash media but some number X of physical locations. Consequently, when processing a read for a particular LBA, a total of X locations in the physical media must be retrieved and checked to return the target data. In some embodiments, the hashing algorithm may be designed so that that each of the X physical locations pointed to by the hashed entry can be accessed concurrently, such as residing on different logical units ("LUNs") or along parallel access channels. In this way no additional time is needed for the read operation, as is the case in tiered forward mapping, and no write penalty or write amplification is incurred, as would be the case with increasing the size of the MU size. Thus, the size of the forward mapping table is reduced with minimal impact on the performance or lifetime of the device.

FIG. 1 illustrates one routine for reducing the size of the forward mapping table in an SSD or other storage device using hashing, according to the embodiments described herein. According to some embodiments, the routine 100 may be performed by a controller of an SSD or other storage device utilizing a forward mapping table to convert LBAs from a host system to physical addresses in the storage media. The routine 100 includes step 102, where a write command is received by the controller. The write command may comprise data to be written and a target LBA for the write, for example. From step 102, the routine 100 proceeds to step 104, where the controller allocates a physical location in the storage media for storage of the data. This may involve locating a free page in a block of NAND flash memory, for example.

The routine 100 proceeds from step 104 to step 106, where the controller hashes the address of the allocated physical location to reduce its size. For example, the physical address may be a 36-bit value representing a composite of the channel, die, block, and page number of the allocated page of NAND flash memory. The hashing algorithm utilized by the controller may reduce the physical address to a 32-bit hash value for storage in the forward mapping table.

According to embodiments, the hashing algorithm utilized may further ensure that the physical location addresses decoded from the hash value upon a read of the target LBA may be accessed in parallel, such as residing on different LUN or along parallel access channels, as will be described in more detail herein.

From step 106, the routine 100 proceeds to step 108, where the hash value derived from the physical address is stored in the forward mapping table by the controller. The forward mapping table may be stored in DRAM memory of the controller, and the hash value may be written in the table at an index comprising the value of the target LBA provided in the write command. It will be appreciated that the controller may also update other mapping tables and metadata in the DRAM and/or on the storage media linking the target LBA to the physical address where the data is to be stored. From step 108, the routine 100 ends.

Figure 2:
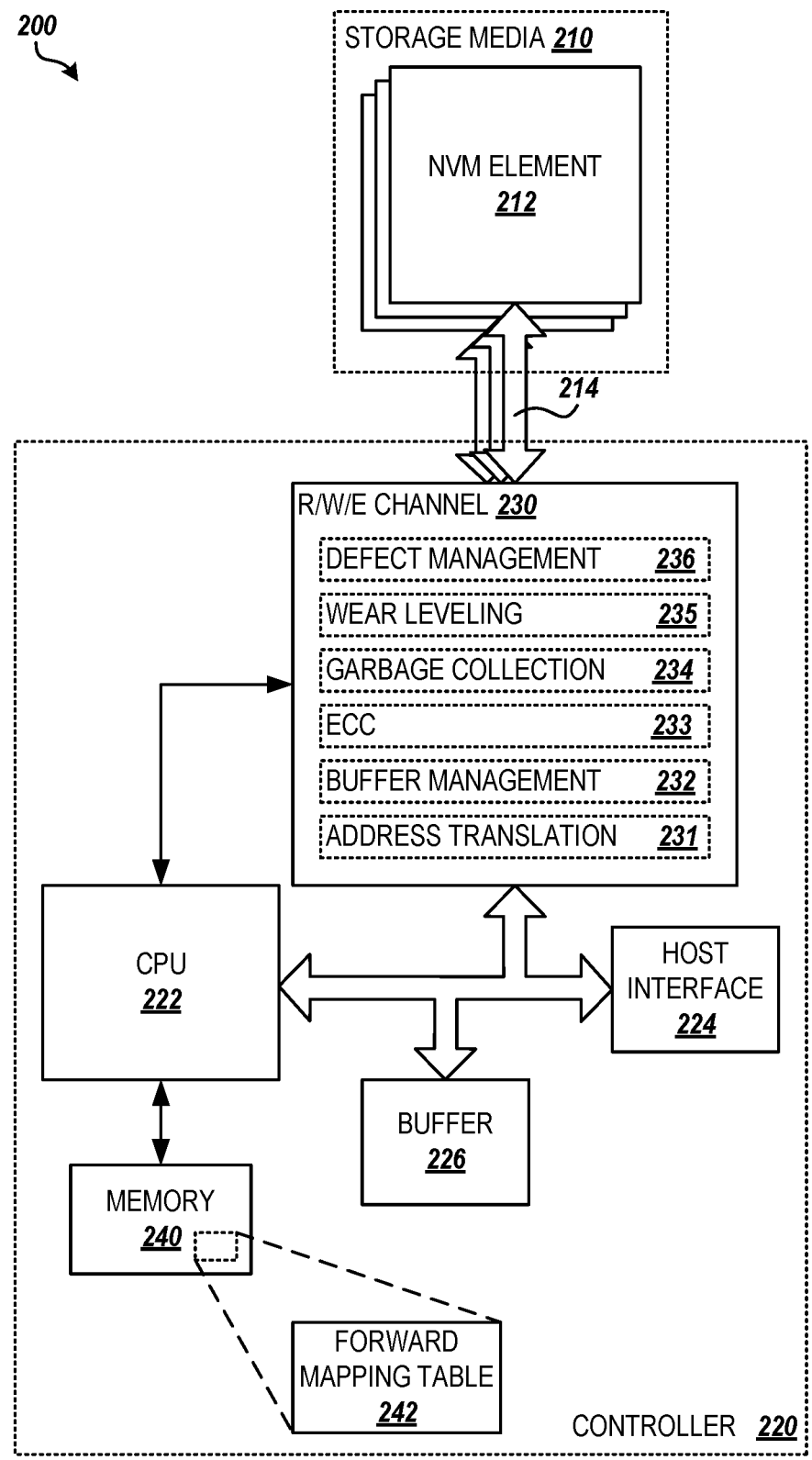
FIG. 2 is a block diagram showing components of an illustrative storage device in which the embodiments described herein may be implemented.

FIG. 2 and the following description are intended to provide a general description of a suitable environment in which the embodiments described herein may be implemented. In particular, FIG. 2 shows an illustrative storage device 200, such as an SSD device, along with hardware, software and components for reducing the size of the forward mapping table in the storage device using hashing, according to the embodiments provided herein. The storage device 200 includes a storage media 210. In some embodiments, the storage media 210 may comprise one or more non-volatile memory ("NVM") elements 212. The NVM elements 212 may comprise NAND flash memory dies. In other embodiments, the storage media 210 may comprise NOR flash memory, vertical NAND ("V-NAND") or 3D NAND flash memory, flash memory using polysilicon or silicon nitride technology-based charge storage cells, phase-change memory ("PCM"), racetrack memory, or any other type of solid-state storage media.

Figure 3:
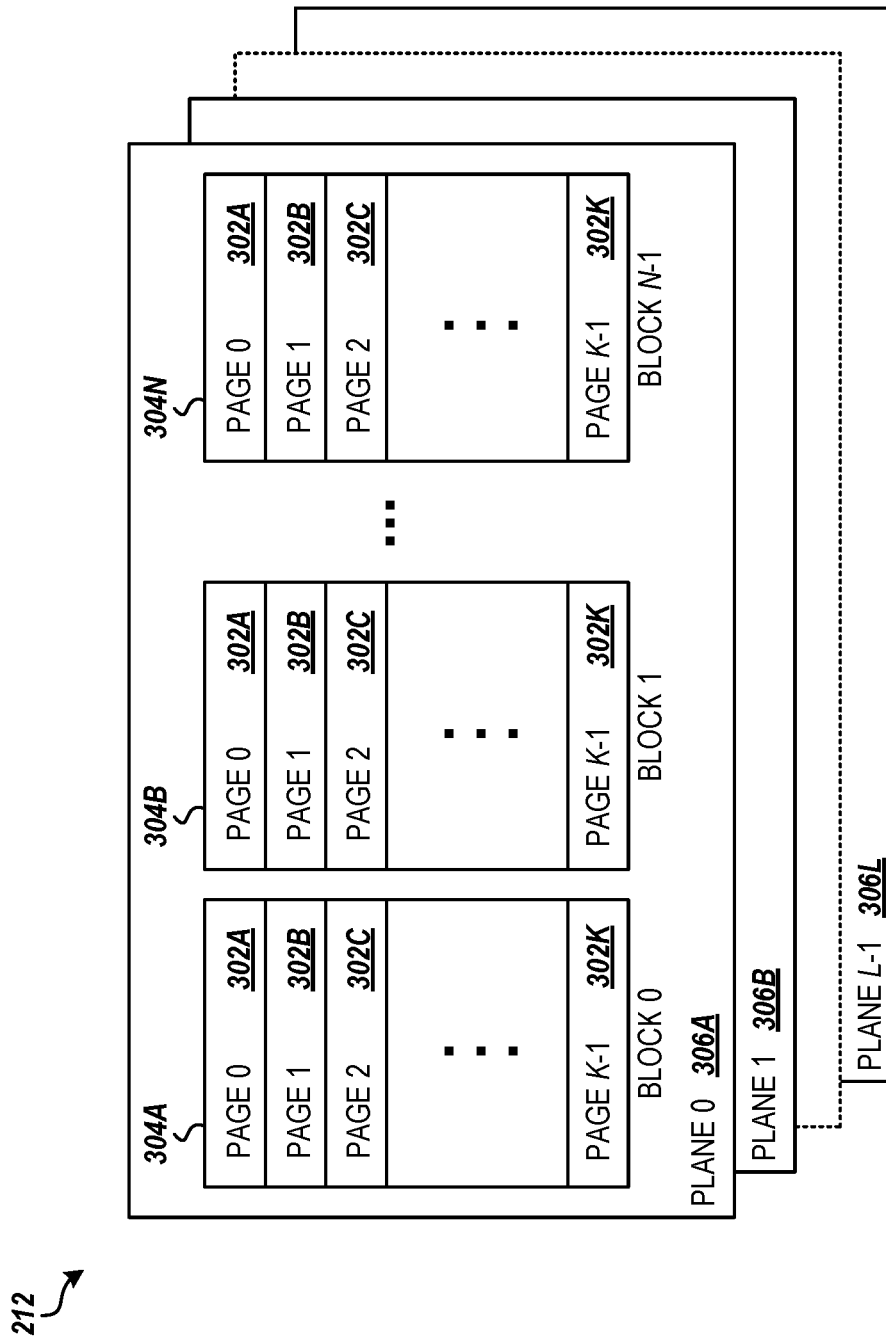
FIG. 3 is a block diagram showing an exemplary storage layout of a NAND flash die, according to embodiments described herein.

FIG. 3 shows one exemplary storage layout of an individual NVM element 212 comprising a multi-layered NAND flash die. The NAND flash die contains numerous storage cells organized into multiple arrays. Each storage cell may store a single bit of data (e.g., single-level cell ("SLC") or multiple bits (e.g., multiple-level cell ("MLC")). Each array of storage cells constitutes a block, such as block 0 through block N−1 304A-304N (referred to generally as block 304), with the rows of each array constituting pages within the block, such as page 0 through page K−1 302A-302K (referred to generally as page 302). The blocks 304 may be spread across multiple layers of the NVM element 212, referred to as planes 306. The storage capacity of a particular NVM element 212 depends on the type of the storage cells (i.e., the number of bits stored per cell), the number of cells per row (page 302), the number of pages per block 304, the number of blocks 304 per plane 306, and the number of planes (layers) in the NVM element. Common page sizes include 4 KB, 8 KB, or 16 KB, with 128, 256, or 512 pages 302 per block 304. Block sizes, therefore, typically vary between 128 KB and 8 MB.

Returning to FIG. 2, the storage device 200 may further comprise a controller 220 that controls the operations of the storage device. According to various embodiments, the controller interfaces with the NVM elements 212 through one or more device interfaces 214. In some embodiments, the device interface(s) 214 comprises of an Open NAND Flash Interface ("ONFI") compatible interface. In further embodiments, the device interface(s) 214 may comprise of one or more of an asynchronous interface; a synchronous interface; a single-data-rate ("SDR") interface; a double-data-rate ("DDR") interface; a toggle-mode compatible flash interface; a non-standard version of any of the preceding interfaces; a custom interface; or any other type of interface used to define the communication with the NVM elements 212.

The device interface(s) 214 may be organized into one or more channels, with each NVM element 212 connected through one of the channels. Each channel may support some number P of NVM elements 212. For example, the device interface(s) 214 may comprise 16 channels, connected to 64 NVM elements 212 organized into four banks. According to embodiments, the controller 220 may be enabled to access NVM elements 212 connected to separate channels concurrently. In further embodiments, the device interface(s) 214 may be organized in one or more groups of channels with one or more of NVM elements 212 per channel, or any other organization of one or more of the NVM elements 212 onto the device interface(s) 214.

The controller 220 may include a central processing unit ("CPU") 222 to monitor and control the operations of the storage device 200. The CPU 222 may represent one or more single-core or multi-core processors known in the art. The controller 220 may further include a host interface 224 allowing the storage device 200 to communicate with one or more host devices or other components (not shown), such as a server computer, personal computer ("PC"), laptop, tablet, game console, set-top box, a storage-area controller, or any other electronics device that can be communicatively coupled to the storage device 200 to store and retrieve data from the storage device. In some embodiments, the controller may be connected to the host device(s) through the host interface 224 via a switch/fabric/intermediate controller (not shown) or some other intermediate device. According to some embodiments, the host interface may be compatible with a Serial ATA ("SATA") interface standard. In further embodiments, the host interface 224 may be compatible with one or more of an IDE interface standard, a SCSI interface standard, a SAS interface standard, a PCIe interface standard, a USB interface standard, a CF interface standard, an MMC interface standard, an SD interface standard, and the like.

The controller 220 may process read and write commands from the host device(s) by formatting the associated data and transferring the formatted data via a read/write/erase channel 230 from and to physical locations on the storage media 210 through the device interface(s) 214. The read/write/erase channel 230 includes the necessary modules and/or circuits to erase, encode, write, read, and decode data from the storage media 210. According to embodiments, the read/write/erase channel 230 includes an address translation module 231 that provides translations between data addressing utilized by the host device(s), e.g., logical bock addresses ("LBAs"), and physical location addressing used by the device interface(s) 214 for the storage media 210, e.g. channel, die, block 304, and pages 302 in the NVM elements 212.

The read/write/erase channel 230 may further include a buffer management module 232 that manages a buffer 226 for the temporary storage of user data and metadata associated with the NVM elements 212 during various access (read and write) operations, according to some embodiments. For example, the buffer 226 may temporarily store write data pending verify operations upon data being programmed to the NVM elements 212. In some embodiments, the buffer 226 may comprise a local memory, such as static random access memory ("SRAM") or dynamic random access memory ("DRAM") onboard the controller 220. In further embodiments, the buffer may include one or more external SRAM or DRAM memories and/or a buffer area in one or more of the NVM elements 212.

In further embodiments, the read/write/erase channel 230 includes an error-correcting code ("ECC") module 233 that provides error correction and/or redundancy functions in the reading or writing of data to and from the NVM elements 212. For example, the ECC module 233 may calculate and write ECC bits along with data programmed to the NVM elements 212. When the data is read back from the NVM elements 212, the ECC module 233 may utilize the ECC bits to correct any read errors. In some embodiments, the ECC algorithms utilized by the ECC module 233 may change from weaker codes gradually moving towards stronger codes as the NVM elements 212 age.

The read/write/erase channel 230 may also include a garbage collection module 234 and a wear-leveling module 235, according to further embodiments. The garbage collection module 234 performs garbage collection by erasing "stale" or no longer used blocks 304 of the NVM elements 212 to make them eligible to be re-written with new data. The garbage collection module 234 may be further enabled to move stored data within or between the NVM elements 212 to make larger contiguous portions of the flash memory available for writing. The wear-leveling module 235 works to ensure program/erase cycles are distributed evenly across all blocks 304 in the NVM elements 212 in order to avoid some prematurely wearing out before other blocks, potentially impacting performance and shortening the lifespan of the storage device 200. For example, wear-leveling module 235 may track a recycle count of each block 304 in the NVM elements 212 in order to allow level use of free blocks for new writes.

In further embodiments, the read/write/erase channel 230 includes a defect management module 236. The defect management module 236 may detect and deal with bad blocks 304 in the NVM elements 212 when the blocks become unusable or unreliable for the storage of data. This may include marking the block 304 as defective and substituting a block from a spare area in the NVM elements 212 for storage of the data in a defective block. It will be appreciated that the defect management module 236, the wear-leveling module 235, the garbage collection module 234, the ECC module 233, the buffer management module 232, and the address translation module 231 may comprise hardware circuits in the read/write/erase channel 230, processor-executable instructions for execution in the CPU 222, or any combination of these and other components in the controller 220.

The controller 220 may further include a computer-readable storage medium or "memory" 240 for storing processor-executable instructions, data structures, and other information. The memory 240 may comprise a non-volatile memory, such as read-only memory ("ROM") and/or flash memory, and a random-access memory ("RAM"), such as SRAM or DRAM. The memory 240 may further comprise a portion of the non-volatile storage media 210 of the storage device 200. For example, the memory 240 may store a firmware that comprises commands and data necessary for performing the operations of the storage device 200. According to some embodiments, the memory 240 may store processor-executable instructions that, when executed by the CPU 222, perform the routines 100 and 800 for reducing the size of the forward mapping table in an SSD or other storage device using hashing, as described herein.

The memory 240 may further store supporting data utilized by the read/write/erase channel 230. According to some embodiments, the memory 240 contains a forward mapping table 242 utilized by the address translation module 231 to lookup physical addresses mapped to LBAs specified in read and write commands. In some embodiments, the forward mapping table 242 may be stored in DRAM on the controller 220 for high-speed address lookup to improve read latency in the storage device 200. In further embodiments, the memory 240 may store other information utilized by the modules of the controller, such as additional mapping tables utilized by the address translation module 231 and the garbage collection module 234, erase/recycle count tables utilized by the wear-leveling module 235, and defective blocks lists utilized by the defect management module 236, among other information.

In addition to the memory 240, the environment may include other computer-readable media storing program modules, data structures, and other data described herein for reducing the size of the forward mapping table in an SSD or other storage device using hashing. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, flash memory or other solid-state memory technology, compact disc ROM ("CD-ROM"), digital versatile disk ("DVD"), or other optical storage, magnetic cassettes, magnetic tape, magnetic disk storage or other magnetic storage devices and the like.

It will be appreciated that the structure of the storage device 200 may be different that that illustrated in FIG. 2 and described herein. For example, the CPU 222, read/write/erase channel 230, memory 240, and other components and circuitry of the storage device 200 may be integrated within a common integrated circuit package, such as a system-on-chip ("SoC"), or they may be distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2, or may utilize an architecture completely different than that shown in FIG. 2.

Figure 4:
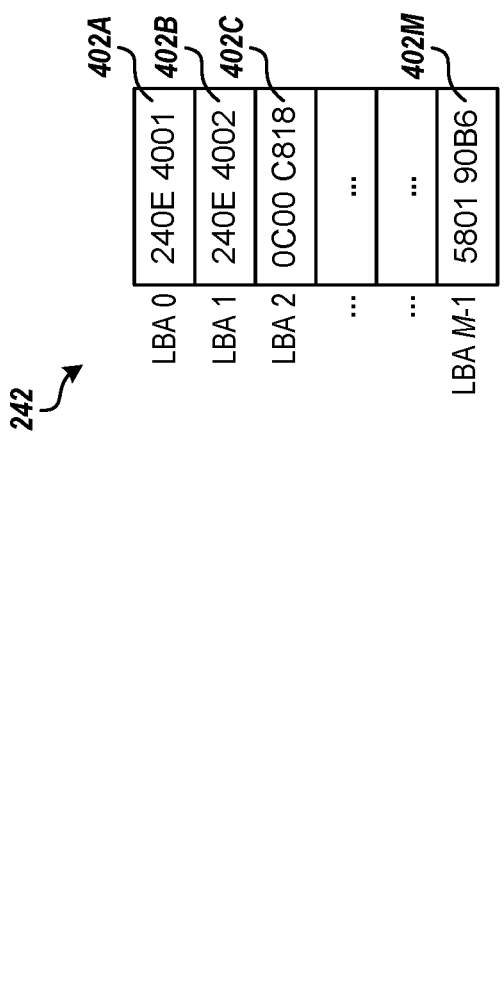
FIG. 4 is a data structure diagram showing details of a forward mapping table in an SSD, according to embodiments described herein.

FIG. 4 shows an example structure of a forward mapping table 242 in an SSD, according to embodiments described herein. According to embodiments, the forward mapping table 242 comprises an ordered list of some number M of forward mapping table entries, such as forward mapping table entries 402A-402M (referred to herein generally as forward mapping table entries 402), indexed by LBA, where M represents the number of LBAs represented to the host system based on LBA size and the storage capacity of the storage device. For example, in a 32 TB SSD with LBA size of 4 KB, the forward mapping table 242 may comprise approximately 8.590 billion entries. At four bytes per entry, this may result in a forward mapping table size of 32 GB.

Figure 5:
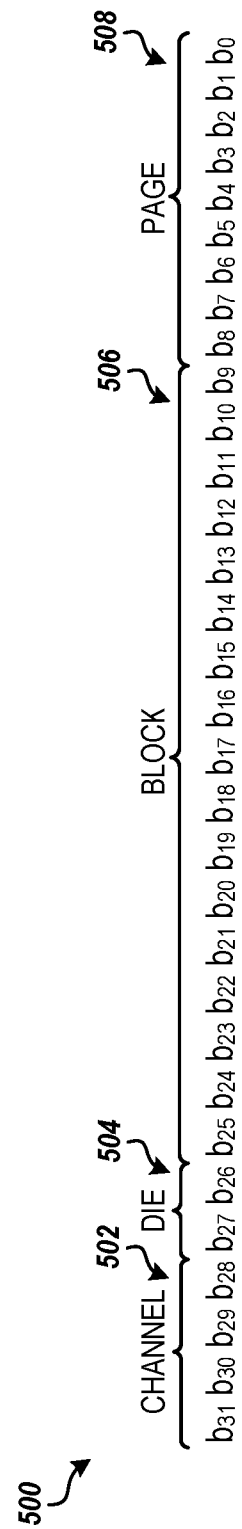
FIG. 5 is a block diagram showing details of a format for storing a physical location address in a forward mapping table, according to embodiments described herein.

FIG. 5 shows an illustrative format 500 for storing a physical location address in the storage media 210 for an SSD in a forward mapping table entry 402, according to some embodiments. As may be seen in the figure, a forward mapping table entry 402 may encode a channel specification 502, die number 504, block number 506, and page number 508 for the physical location of the stored data for the corresponding LBA. Utilizing the format 500 shown, unique physical addresses for a storage media 210 of an SSD comprising of 16 channels of 4 dies (NVM elements 212) each, with each die having 128K blocks 304 comprising 512 pages 302 each, may be represented in a 32-bit value for storage in the forward mapping table entries 402, according to embodiments described herein.

Figure 6:
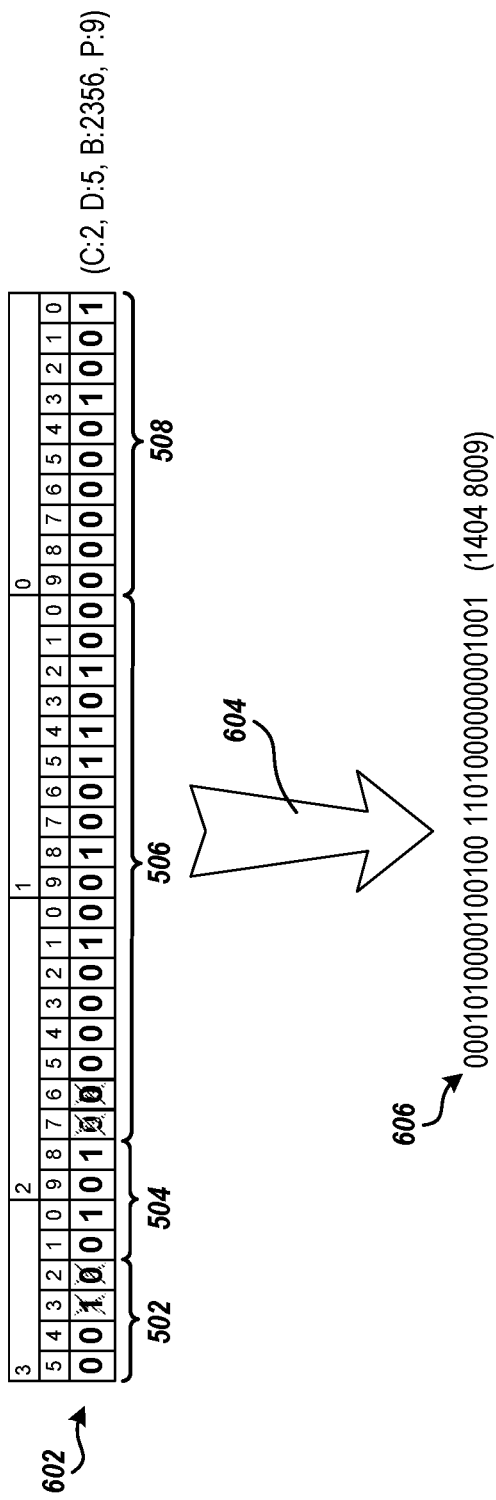
FIG. 6 is a block diagram showing details of one scheme for hashing a physical address for storing in a forward mapping table, according to embodiments described herein.

It will be appreciated that, if any of the specifications of the SSD were increased in order to support increased capacity of the device, the combination of the channel specification 502, die number 504, block number 506, and page number 508 for unique physical addresses may result in a larger value than that shown in FIG. 5. For example, as shown in FIG. 6, an SSD comprising 16 channels of 16 dies (NVM elements 212) each, with each die having 256K blocks 304 comprising 1024 pages 302, may require a 36-bit physical address value 602 to encode the channel specification 502, die number 504, block number 506, and page number 508 for a unique physical location in the storage media 210. The 36-bit physical address value 602 may result in a substantial increase in the size of the forward mapping table 242, requiring more DRAM in the controller 220 for storage of the table, thus increasing the cost of the storage device 200. In addition, a 36-bit value cannot be stored efficiently within the word boundary of modern CPUs, requiring that either the size of each forward mapping table entry 402 be increased to 48 bits or 64 bits, further increasing the size of the forward mapping table 242, or the implementation of a scheme for the CPU to access the forward mapping table entries 402 on non-word aligned boundaries, which may be computationally expensive and adversely affect read latency in the storage device 200.

As further shown in FIG. 6, a hashing algorithm 604 may be utilized to hash the 36-bit physical address value 602 to a smaller hash value 606 more suitable for storage in the forward mapping table 242. According to embodiments, the resulting hash value 606 may point to some number X of physical locations in the storage media 210, depending on the number of bits of size reduction obtained. The hashing algorithm may further be designed to ensure that each of the X physical locations can be accessed concurrently in order to mitigate increase read times due to implementation of the hashing algorithm 604. Different types of hashes may be combined in the hashing algorithm 604 in order to achieve the desired size reduction while accomplishing the goal of allowing the X physical locations pointed to by the hash value 606 to be accessed concurrently.

In some embodiments, the hashing algorithm 604 may include channel hashing. For example, if the storage device 200 contains 16 channels, the channel specification 502 portion of the physical address value 602 would require four bits to uniquely identify the channel. However, if the two least-significant bits of the 4-bit value were removed, the remaining two bits would indicate that the data for an LBA resides on one of four channels. Because the dies (NVM elements 212) on each channel can be accessed concurrently, the target physical location can be read across the four channels at the same time. Thus the hash value 606 for storage in the forward mapping table 242 can be reduced in size by two bits with any connected host device(s) seeing little or no increase in read latency. In other embodiments, one, three, or any number of other bits may be dropped from the channel specification 502 portion of the physical address value 602 to achieve the desired reduction in size of the forward mapping table entries 402.

In further embodiments, the hashing algorithm 604 may include block hashing. Many modern NAND flash memory dies allow the concurrent issuance of read commands to as many blocks 304 as the die has planes 306. Accordingly, in a storage device 200 implementing NVM elements 212 with four planes 306, the controller 220 can read a same block specification from each of the four planes concurrently. In this case, the bits that indicate a unique plane 306 can be removed from the block number 506 portion of the physical address value 602. For example, as shown in FIG. 6, the 2 most significant bits of the block number 506 may specify on which of the four planes the block resides. These 2 bits can be removed from the physical address value 602 by the hashing algorithm 604, with the same block being accessed from all four planes of the target die simultaneously when the LBA data is retrieved. Thus the hash value 606 for storage in the forward mapping table 242 can be further reduced in size by another two bits without any additional increase in read latency.

By combining the channel hashing and block hashing into the hashing algorithm 604, the 36-bit physical address value 602 can be hashed to a smaller 32-bit hash value 606 for storage in the forward mapping table 242 for the corresponding LBA. Other hashes that could be incorporated into the hashing algorithm 604 to further reduce the size of the forward mapping table entries 402 may be imagined by one of ordinary skill upon reading this disclosure. For example, if a storage device 200 provided for concurrent access to groups or divisions of pages 302 in the blocks 304 of the storage media, page hashing could be included in the hashing algorithm for additional size reduction. It is intended that all such hashes be included in the scope of this disclosure.

In further embodiments, the various hashing methods could be combined with the other methods described herein to reduce the size of the forward mapping table 242 in a storage device 200 in both dimensions at the same time. For example, one approach may be to select a MU size equal to the lowest average write granularity for the system comprising the storage device and attached host device(s). In many systems, this would be 8 LBAs per MU, reducing the vertical size of the forward mapping table 242 by a factor of 8. Adding block hashing reduces the size of each forward mapping table entries 402 by a number of bits based on the number of planes per die (NVM element 212), usually two (one bit) or four (two bits), since concurrent access of blocks across planes are essentially "free" from a performance perspective. Channel hashing could then be utilized as needed to reduce the size of the forward mapping table entries 402 down to 32 bits to fit within the word boundary of the CPU 222, and then tiered forward mapping could be utilized to in such a way to ensure that the segments (tiers) of the forward mapping table 242 could fit into the DRAM available to the controller 220.

According to embodiments, when a read command is received from a host device by the controller 220 of the storage device 200, the hash value 606 may be retrieved from the forward mapping table entry 402 for the LBA specified by the read command, and the X possible physical location addresses for the target data may be determined based on the retrieved hash value and a reverse of the hashing algorithm 604. For example, if a physical address value 602 specifying channel 2, die 5, block 2356, and page 9 is hashed by the hashing algorithm 604 described above to generate the hash value 606 shown in FIG. 6, then this value read from the forward mapping table 242 for the LBA of a read command would indicate X=16 target physical locations, or more specifically, page 9 of block 2356 on planes 0-3 of die 5 on channels 0-3. The controller 220 could then initiate plane reads (i.e., read across all four planes 306 concurrently) for page 9 of block 2356 on die 5 on channels 0, 1, 2, and 3 at the same time, with the NVM elements 212 returning the page data to the controller 220 asynchronously.

Figure 7:
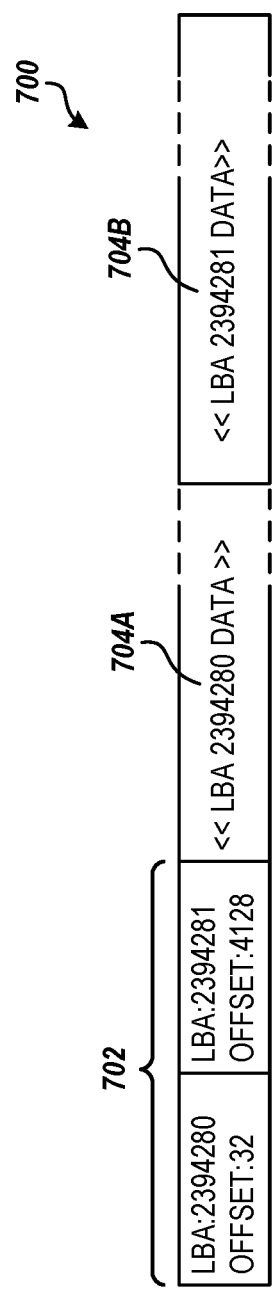
FIG. 7 is a data structure diagram showing details of one layout for a page in NAND flash memory including metadata for the page data, according to embodiments described herein.

In order to determine which of the physical locations read contains the target data corresponding to the requested LBA, the controller 220 may check metadata associated with the returned page data to determine which data to return to the host device. FIG. 7 provides an illustrative layout 700 for a page 302 in NAND flash memory, according to some embodiments. The page data may include metadata 702 describing the contents of the remaining page data. For example, as show in the figure, an 8 KB page 302 in the storage media 210 may contain data related to two 4 KB LBAs, LBA 2394280 704A and LBA 2394281 704B. The metadata 702 may further specify the position (offset) of the data for each of the LBAs in the page 302, as further shown. As the page data is returned from the 16 concurrent reads, the controller 220 may check the metadata 702 associated with each page data to locate the matching LBA specified in the read command and select the target data to return to the host device.

As would be understood by one skilled in the art, a very rare circumstance may arise where decoding the hash value 606 results in physical address values 602 for multiple, separate pages 302 in the storage media 210 that contain data mapped to the same LBA. For example, new data for the LBA may have been received at the device and written to the storage media 210 in a new physical location, leaving the old location containing "stale" data not yet freed by the garbage collection process. According to some embodiments, if page data from multiple physical locations mapped to the LBA is returned to the controller 220 in response to the concurrent reads, then the controller may check a timestamp for a garbage collection unit associated with the pages 302 to determine which page data contains the newest data mapped to the LBA to return to the host. In other embodiments, a timestamp or sequence number may exist in the metadata 702 associated with the pages 302 that may indicate the newest data to return.

Figure 8:
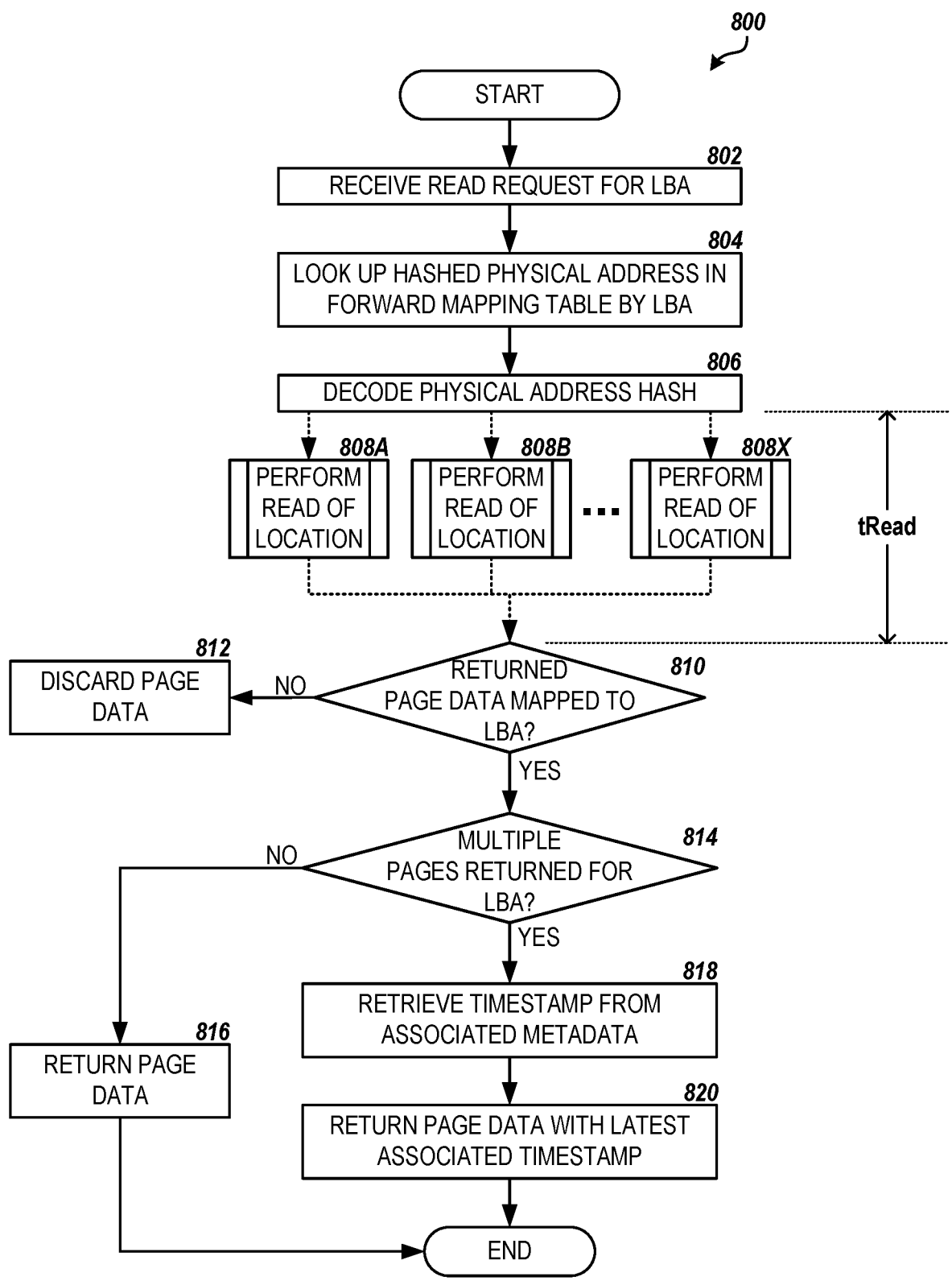
FIG. 8 is a flow diagram showing a routine for performing a read from a storage device utilizing hashed physical addresses to reduce forward mapping table size, according to embodiments described herein.

FIG. 8 illustrates one routine 800 for performing a read from a storage device utilizing hashed physical addresses in the forward mapping table size, according to some embodiments. According to embodiments, the routine 800 may be performed at least in part by the address translation module 231 in the controller 220 of an SSD or other storage device 200. In further embodiments, the routine 800 may be performed by the controller of the storage device, by external processors or computing systems performing storage processing in the storage device, or by some other combination of modules, processors, and devices.

The routine 800 begins at step 802, where the controller 220 of the storage device 200 receives a read request from a host device specifying an LBA of the requested data. From step 802, the routine 800 proceeds to step 804, where the address translation module 231 looks up the physical address hash value 606 from the forward mapping table 242 for the specified LBA. As described herein, if the forward mapping table 242 is contained completely within the DRAM of the controller 220 due to its decreased size, the address translation module 231 may simply retrieve the forward mapping table entry 402 from the forward mapping table by the index of the LBA number to get the hash value 606.

Next, at step 806, the address translation module 231 decodes the hash value 606 to determine X possible physical location addresses for the target data. This is done by reversing the hashing algorithm 604 utilized to generate the hash value 606 stored in the forward mapping table 242. For example, if a physical address value 602 specifying channel 2, die 5, block 2356, and page 9 is hashed by the hashing algorithm 604 to generate the hash value 606, as described above in regard to FIG. 6, then reversing the hashing algorithm would yield X=16 target physical locations comprising page 9 of block 2356 on each of the planes 0-3 of die 5 on channels 0-3.

From step 806, the routine 800 proceeds to steps 808A-808X, where the controller issues concurrent reads for all of the X physical location addresses decoded from the hash value 606. In the example given above, the controller would initiate plane reads (i.e., read across all four planes 306 concurrently) for page 9 of block 2356 on die 5 on channels 0, 1, 2, and 3 at the same time. Because the reads across the planes 306 of each die (NVM element 212) and the reads on the different channels all occur concurrently, the storage device would only substantially incur one tRead for performing all of the reads operations 808A-808X, where "tRead" represents the amount of time elapsed from applying a physical address to an NVM element until valid data appears at the output of the NVM element.

Next, at step 810, the controller 220 checks the page data returned from each read operation 808A-808X to see if it contains the target data for the specified LBA. According to some embodiments, this may comprise checking metadata 702 associated with the page 302 to determine whether the page contains the data mapped to the LBA. If page data returned from one of the read operations 808A-808X does not contain data mapped to the LBA, then the routine 100 proceeds from step 810 to step 812, where the returned page data is discarded. If the page data is mapped to the LBA, then the routine proceeds from step 810 to step 814, where the controller 220 determines whether page data from multiple read operations were returned that are mapped to the LBA. This may be the case when new data for the LBA was subsequently written to the storage device 200 in a new page 302, leaving an old page containing "stale" data not yet freed by the garbage collection process, for example.

If page data from multiple read operations mapped to the LBA were not returned, then the routine 800 proceeds from step 814 to step 816, where the returned page data mapped to the LBA is returned to the host device. If multiple read operations returned page data mapped to the LBA, then the routine 800 proceeds from step 814 to step 818, where the controller 220 retrieves a timestamp associated with each page 302 containing data mapped to the LBA. The timestamps may be retrieved from metadata 702 associated with each page 302, a garbage collection unit associated with the page, or some other metadata maintained in the memory 240 or on storage media 210. From step 818, the routine 800 proceeds to step 820, where the controller returns the page data mapped to the LBA that is associated with the latest timestamp value. From step 820, the routine 800 ends.

Based on the foregoing, it will be appreciated that technologies for reducing the size of the forward mapping table in an SSD or other storage device using hashing are presented herein. While embodiments are generally described herein in regard to an SSD implementing flash storage, it will be appreciated that the embodiments described in this disclosure may be utilized in any storage device implementing any storage technology where high performance read operations is a goal. This may include SSDs, hybrid magnetic and solid-state drives, magnetic hard disk drives, USB flash drives, memory cards and cartridges, storage controllers for arrays of flash memory devices, storage controllers for arrays of high-speed magnetic disk drives, and the like. The above-described embodiments are merely possible examples of implementations, merely set forth for a clear understanding of the principles of the present disclosure.

It will be appreciated by one skilled in the art that the data structures shown in FIGS. 4, 6, and 7 and described herein are provided for illustrative purposes only, and may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice and may depend on the technology, performance and other requirements of the memory 240, CPU 222, controller 220, or other elements of the storage device 200 in which the data structures are implemented. It will be further appreciated that the data structures may contain additional data elements beyond those shown in the figures described herein.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method implemented in a controller of a storage device comprising steps of:
    determining a physical address of a storage location within a storage media of the storage device to store data associated with a logical block address;
    writing the data to the storage location;

computing a hash value from a representation of the physical address using a hash function, the hash value having a smaller size than the representation of the physical address and pointing to a plurality of separate storage locations in the storage media; and storing the hash value in a mapping table of the controller in a location corresponding to the logical block address associated with the data.

2. The method of claim 1, wherein the hash function is configured such that the plurality of separate storage locations can be accessed in the storage media concurrently by the controller.

3. The method of claim 1, wherein the hash function comprises hashing a channel specification portion of the representation of the physical address.

4. The method of claim 1, wherein the hash function comprises hashing a block number portion of the representation of the physical address.

5. The method of claim 1, wherein the mapping table is stored in a RAM of the controller.

6. The method of claim 1, wherein a size of the representation of the physical address does not allow the representation of the physical address to be stored within a word boundary of a CPU of the controller, and wherein the hash value is stored within the word boundary of the CPU.

7. The method of claim 1, further comprising the steps of:
in response to receiving a read command specifying the logical block address, retrieving the hash value from the mapping table based on the logical block address;
computing physical addresses for each of the plurality of separate storage locations from the hash value using a reverse of the hash function;
reading data from the plurality of separate storage locations based on the computed physical addresses; and
determining the data associated with the logical block address to return for the read command based on header information associated with the data read from the plurality of separate storage locations.

8. The method of claim 7, further comprising the steps of:
determining that data read from two storage locations of the plurality of separate storage locations are associated with the logical block address;
retrieving a timestamp associated with each of the data from the two storage locations; and
determining the data associated with the logical block address to return for the read command based on a later value of the timestamp associated with each of the data.

9. The method of claim 1, wherein the storage media comprises NAND flash memory and the storage device comprises a solid-state disk ("SSD") device.

10. A storage device comprising:
a non-volatile memory comprising a plurality of storage locations;
a forward mapping table for mapping logical block addresses to the plurality of storage locations; and
a controller for storing user data from a host to the non-volatile memory, the controller configured to
determine a physical address of a storage location within the non-volatile memory to store data associated with a logical block address,
write the data to the storage location,
compute a hash value from the physical address of the storage location using a hash function,
store the hash value in the forward mapping table associated with the logical block address,
in response to receiving a read command specifying the logical block address, retrieve the hash value from the forward mapping table based on the logical block address,
compute a plurality of physical addresses from the hash value using a reverse of the hash function,
read data from storage locations within the non-volatile memory corresponding to each of the plurality of physical addresses, and
determine the data associated with the logical block address to return for the read command based on header information associated with the data read from the storage locations.

11. The storage device of claim 10, wherein the hash function is configured such that the storage locations corresponding to the plurality of physical addresses can be accessed in the non-volatile memory concurrently by the controller.

12. The storage device of claim 10, wherein the forward mapping table is stored in a RAM of the controller.

13. The storage device of claim 12, wherein a size of the hash value is smaller than a size of a representation of the physical address.

14. The storage device of claim 12, wherein a size of a representation of the physical address does not allow the representation of the physical address to be stored within a word boundary of a CPU of the controller, and wherein the hash value is stored within the word boundary of the CPU.

15. The storage device of claim 10, wherein the hash function comprises hashing a channel specification portion of the physical address.

16. The storage device of claim 10, wherein the hash function comprises hashing a block number portion of the physical address.

17. A non-transitory computer-readable storage medium containing processor-executable instructions that, when executed by a CPU of a controller of a storage device, cause the CPU to:
determine a physical address of a storage location within a storage media of the storage device to store data associated with a logical block address;
compute a hash value from the physical address of the storage location using a hash function, a size of the hash value being smaller than a size of a representation of the physical address;
store the hash value in a forward mapping table of the controller, the hash value stored in a location within the forward mapping table associated with the logical block address;
in response to receiving a read command specifying the logical block address, retrieve the hash value from the forward mapping table based on the logical block address;
compute a plurality of physical addresses from the hash value using a reverse of the hash function;
read data from storage locations within the storage media corresponding to each of the plurality of physical addresses; and
determine the data mapped to the logical block address to return for the read command based on header information associated with the data read from the storage locations.

18. The non-transitory computer-readable storage medium of claim 17, wherein the hash function is configured such that the storage locations corresponding to the plurality of physical addresses can be accessed in storage media concurrently by the controller.

19. The non-transitory computer-readable storage medium of claim 17, wherein the hash function comprises one or more of hashing a channel specification portion of the physical address and hashing a block number portion of the physical address.

20. The non-transitory computer-readable storage medium of claim 17, wherein the forward mapping table is stored in a RAM of the controller.

* * * * *